(12) United States Patent
Fogg et al.

(10) Patent No.: US 10,267,478 B2
(45) Date of Patent: Apr. 23, 2019

(54) LIGHT BAR ASSEMBLY INCLUDING A WIND SHIELD

(71) Applicant: Tractor Supply Company, Brentwood, TN (US)

(72) Inventors: Christian D. Fogg, Columbia, TN (US); Brian Kennemer, Chapel Hill, TN (US); Ty Rager, Hendersonville, TN (US)

(73) Assignee: Tractor Supply Company, Brentwood, TN (US)

( * ) Notice: Subject to any disclaimer, the term of this patent is extended or adjusted under 35 U.S.C. 154(b) by 101 days.

(21) Appl. No.: 15/435,537

(22) Filed: Feb. 17, 2017

(65) Prior Publication Data

US 2018/0238516 A1   Aug. 23, 2018

(51) Int. Cl.
| | |
|---|---|
| *B60Q 1/02* | (2006.01) |
| *F21S 41/20* | (2018.01) |
| *F21S 41/32* | (2018.01) |
| *F21S 41/39* | (2018.01) |
| *F21S 41/55* | (2018.01) |
| *F21S 45/47* | (2018.01) |
| *F21S 45/50* | (2018.01) |
| *F21S 41/143* | (2018.01) |
| *F21S 41/153* | (2018.01) |

(52) U.S. Cl.
CPC ............... *F21S 41/55* (2018.01); *B60Q 1/02* (2013.01); *F21S 41/143* (2018.01); *F21S 41/153* (2018.01); *F21S 41/28* (2018.01); *F21S 41/321* (2018.01); *F21S 41/39* (2018.01); *F21S 45/47* (2018.01); *F21S 45/50* (2018.01)

(58) Field of Classification Search
CPC .............. F21S 41/55; F21S 45/47; B60Q 1/02
See application file for complete search history.

(56) References Cited

U.S. PATENT DOCUMENTS

| | | |
|---|---|---|
| 4,791,402 A | 12/1988 | Vaughn |
| 4,816,968 A | 3/1989 | Yamada et al. |
| 5,101,326 A | 3/1992 | Roney |
| 5,188,445 A | 2/1993 | Haun et al. |
| 5,309,277 A | 5/1994 | Deck |
| 5,373,426 A | 12/1994 | O'Sullivan |
| 5,798,691 A | 8/1998 | Kao |
| 5,988,840 A | 11/1999 | Wirtz |
| 6,190,026 B1 | 2/2001 | Moore |
| 6,520,669 B1 | 2/2003 | Chen et al. |
| 6,561,690 B2 | 5/2003 | Balestiero et al. |
| 6,592,238 B2 | 7/2003 | Cleaver et al. |
| 6,986,597 B2 | 1/2006 | Elwell |
| D526,430 S | 8/2006 | Hernandez et al. |

(Continued)

*Primary Examiner* — Mary Ellen Bowman
(74) *Attorney, Agent, or Firm* — Lucian Wayne Beavers; Patterson Intellectual Property Law, PC

(57) ABSTRACT

A light bar assembly may include a light bar housing having a bar length. The light bar housing may include a plurality of fins projecting from the light bar housing. The light bar housing may further include a plurality of fin gaps. Each fin gap may be disposed between adjacent respective fins. Each fin gap may also have a gap length running longitudinally along a majority of the bar length of the light bar housing. The light bar assembly may also include a wind shield disposed on the light bar housing. The wind shield may cover some, but not all, of the fin gaps along a majority of each respective gap length.

20 Claims, 13 Drawing Sheets

(56) References Cited

U.S. PATENT DOCUMENTS

| | | |
|---|---|---|
| 7,095,318 B1 | 8/2006 | Bekhor |
| 7,163,320 B2 | 1/2007 | Liu |
| 7,217,004 B2 | 5/2007 | Park et al. |
| D576,754 S | 9/2008 | Wang |
| 7,695,164 B2 | 4/2010 | Berben et al. |
| 7,726,845 B2 | 6/2010 | Zheng et al. |
| 7,758,211 B2 | 7/2010 | Zheng et al. |
| 7,806,560 B2 | 10/2010 | Schultz et al. |
| D642,302 S | 7/2011 | Schiavone et al. |
| D643,951 S | 8/2011 | Cai |
| 8,092,049 B2 | 1/2012 | Kinnune et al. |
| D653,783 S * | 2/2012 | Biro .................... D26/31 |
| 8,220,976 B2 | 7/2012 | Liu et al. |
| 8,246,219 B2 | 8/2012 | Teng et al. |
| 8,313,222 B2 | 11/2012 | Kinnune et al. |
| 8,317,369 B2 * | 11/2012 | McCanless ........... F21V 29/745 362/368 |
| 8,430,195 B2 | 4/2013 | Jansen et al. |
| 8,591,057 B2 | 11/2013 | Kawabata et al. |
| D713,574 S * | 9/2014 | Adams .................... D26/31 |
| 8,888,306 B2 | 11/2014 | Thomas et al. |
| 8,979,303 B2 | 3/2015 | Adams |
| D751,753 S | 3/2016 | Adams et al. |
| 2004/0170017 A1 | 9/2004 | Zhan et al. |
| 2008/0290357 A1 | 11/2008 | Lin et al. |
| 2009/0161377 A1 * | 6/2009 | Helms ................. B60Q 1/0483 362/493 |
| 2009/0323342 A1 | 12/2009 | Liu |
| 2010/0073637 A1 | 3/2010 | Matsumoto et al. |
| 2010/0091507 A1 | 4/2010 | Li et al. |
| 2010/0328947 A1 | 12/2010 | Chang et al. |
| 2011/0058368 A1 * | 3/2011 | Shiau ..................... F21V 14/02 362/225 |
| 2011/0176297 A1 | 7/2011 | Hsia et al. |
| 2011/0233568 A1 | 9/2011 | An et al. |
| 2013/0107519 A1 | 5/2013 | Kim et al. |
| 2014/0016313 A1 * | 1/2014 | Adams ..................... F21K 9/30 362/235 |
| 2014/0078762 A1 * | 3/2014 | Adams ................... F21V 21/30 362/496 |
| 2014/0268771 A1 | 9/2014 | Heikman |
| 2016/0258598 A1 * | 9/2016 | Adams ................. F21S 48/328 |

\* cited by examiner

LIGHT BAR ASSEMBLY INCLUDING A WIND SHIELD

BACKGROUND

The present disclosure relates generally to light bars for mounting on the cab of a pickup truck or the like.

Light bars are often mounted at various locations on trucks and other off-road vehicles to provide auxiliary lighting. One potential location for such light bars is adjacent the top front edge of the cab of the truck. Traditionally, such light bars have either been straight light bars or curved light bars.

Light bars may further include indentations or cavities that may catch the wind while the vehicle is in motion. If the light bar is in a certain orientation or position, the wind may cause a sound that may be undesirable to a user.

What is needed, therefore, is an improvement in the design of such light bars to prevent at least some of the above described sound.

BRIEF SUMMARY

Briefly, the present disclosure relates, in one embodiment, to a light bar assembly. The light bar assembly may include a light bar housing having a bar length. The light bar housing may include a plurality of fins projecting from the light bar housing. The light bar housing may further include a plurality of fin gaps. Each fin gap may be disposed between adjacent respective fins. Each fin gap may also have a gap length running longitudinally along a majority of the bar length of the light bar housing. The light bar assembly may also include a wind shield disposed on the light bar housing. The wind shield may cover some, but not all, of the fin gaps along a majority of each respective gap length.

In any of the above embodiments, the light bar housing may include a top side and a bottom side opposite the top side. The wind shield may cover fin gaps that are closer to the bottom side than the top side.

In any of the above embodiments, the wind shield may cover all the fin gaps that are closer to the bottom side than the top side.

In any of the above embodiments, the light bar housing may be configured such that, when the light bar assembly is mounted to a vehicle, the bottom side is closer to the vehicle than the top side.

In any of the above embodiments, the light bar housing may further include a ridge disposed on the bottom side of the light bar housing. The wind shield may include a ridge catch configured to extend over the ridge.

In any of the above embodiments, the wind shield may further include a fin catch opposite the ridge catch. The fin catch may be configured to extend over a respective fin.

In any of the above embodiments, the ridge catch and the fin catch of the wind shield may be biased toward one another such that the wind shield may be clampingly disposed on the light bar housing.

In any of the above embodiments, the wind shield may be configured to overlap at least a portion of the bottom side of the light bar housing. A fastener may extend through the wind shield and into the bottom side of the light bar housing to connect the wind shield to the light bar housing.

In any of the above embodiments, the light bar housing may be straight along the entire bar length of the light bar housing.

In any of the above embodiments, the light bar housing may include at least one bar curve along the bar length of the light bar housing.

In any of the above embodiments, the light bar housing may be curved along the entire bar length of the light bar housing.

In any of the above embodiments, the wind shield may include a plurality of wind shield sections.

In any of the above embodiments, at least one wind shield section may include a curved wind shield section.

In any of the above embodiments, each wind shield section may be connected to the light bar housing with at least two fasteners.

In any of the above embodiments, the wind shield may include at least one wind shield curve that is concentric with the at least one bar curve of the light bar housing.

In any of the above embodiments, the light bar housing may further include a first end cap and a second end cap opposite the first end cap. Both the first end cap and the second end cap may be configured to allow air to pass axially along the bar length between adjacent fins.

The present disclosure also relates, in one embodiment, to a method of manufacturing a light bar assembly. The method may include providing a light bar housing including a plurality of fins and a plurality of fin gaps. Each fin gap may be disposed between adjacent respective fins. The method may also include covering some, but not all, of the fin gaps, thereby preventing air from passing over each covered fin gap in a direction perpendicular to the adjacent respective fins of the covered fin gap.

In any of the above embodiments, the method may further include maintaining first and second ends of the light bar housing at least partially unobstructed such that air may flow axially along a length of the light bar housing between the plurality of fins.

In any of the above embodiments, the method may further include covering at least two fin gaps that are closer to a bottom side of the light bar housing than a top side of the light bar housing, the bottom side being opposite the top side.

In any of the above embodiments, the method may further include covering all of the fin gaps that are closer to the bottom side of the light bar housing than the top side of the light bar housing.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figures 1, 2:
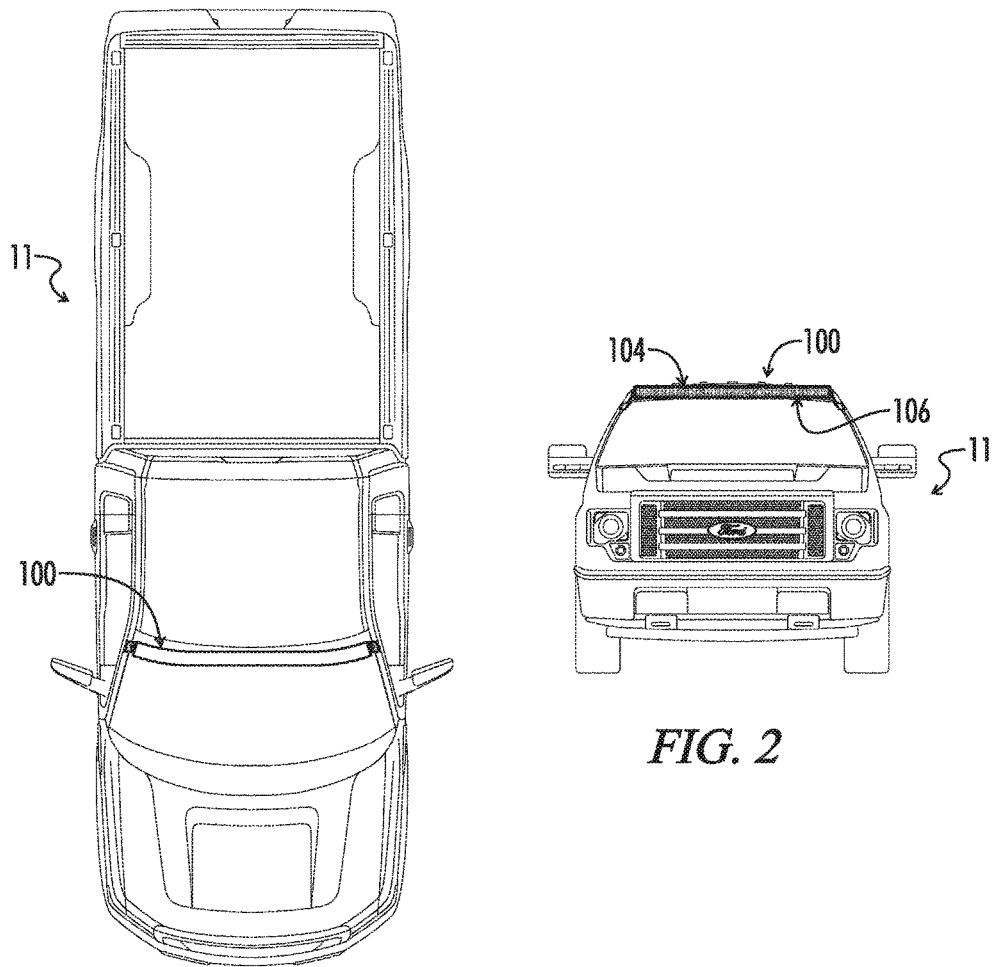
FIG. 1 is a top plan view of a pickup truck showing an embodiment of the light bar assembly of the present invention mounted thereon.
FIG. 2 is a front elevation view of the truck of FIG. 1.
Figure 3:
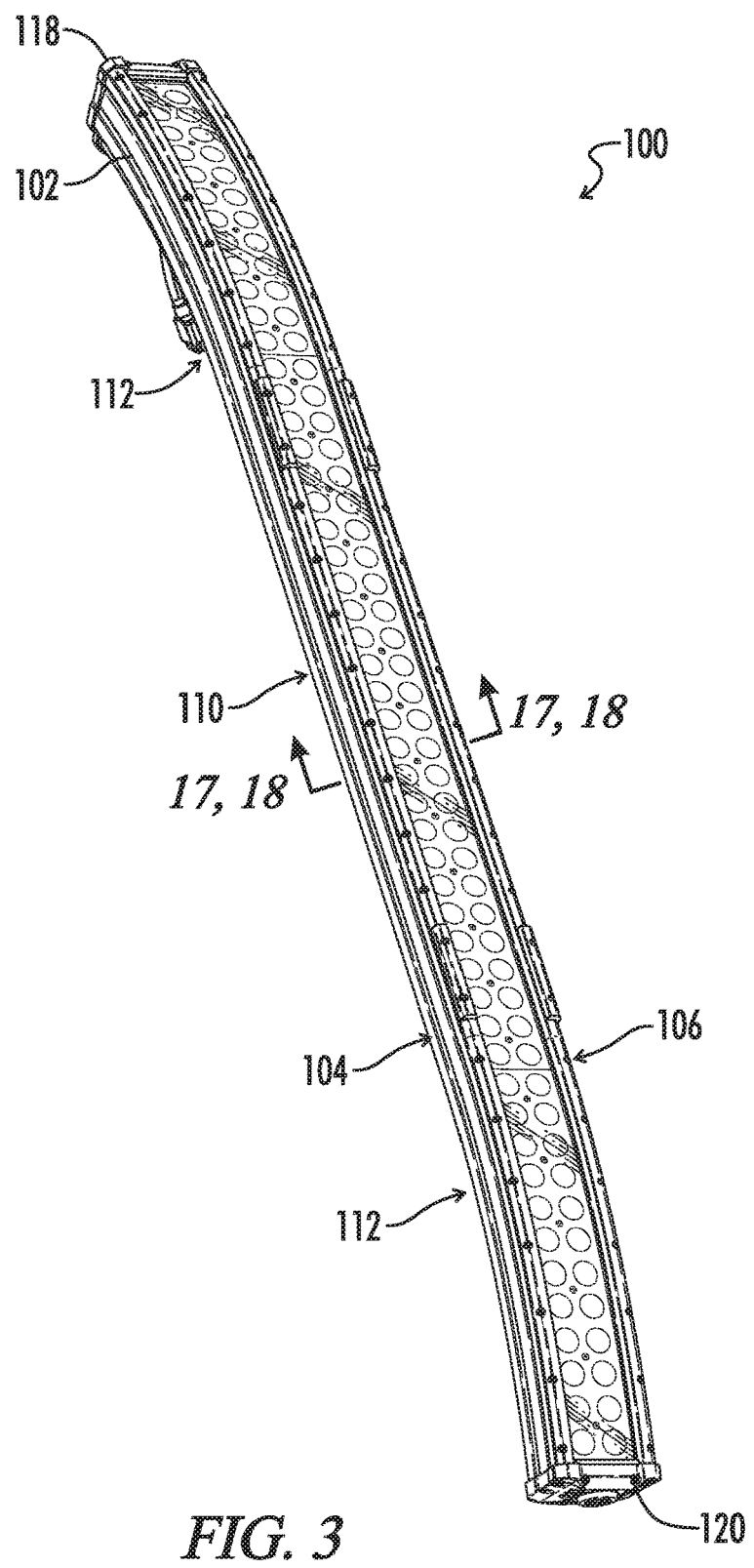
FIG. 3 is a front upper perspective view of the light bar assembly of FIG. 1.
Figure 4:
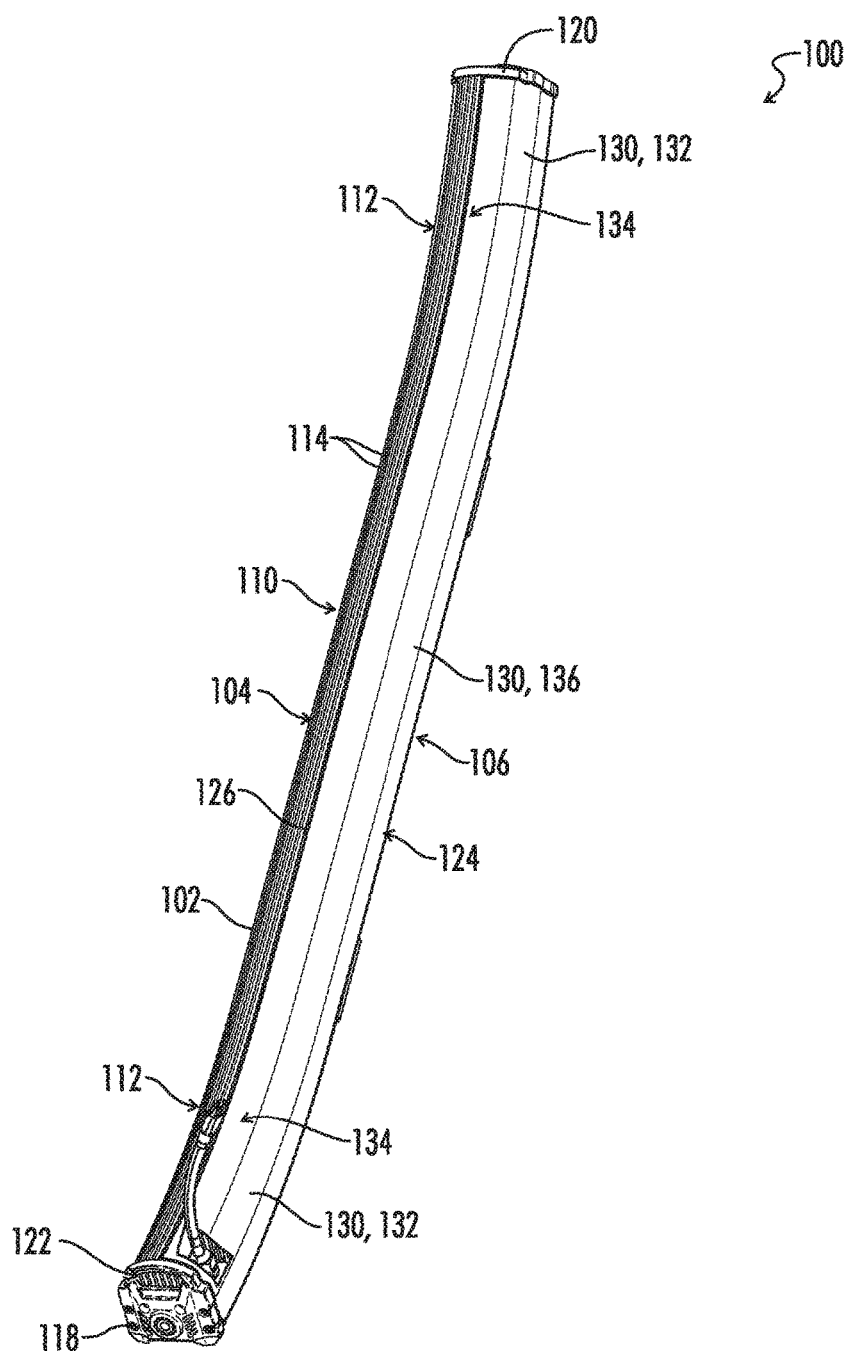
FIG. 4 is a rear lower perspective view of the light bar assembly of FIG. 1.
Figure 5:
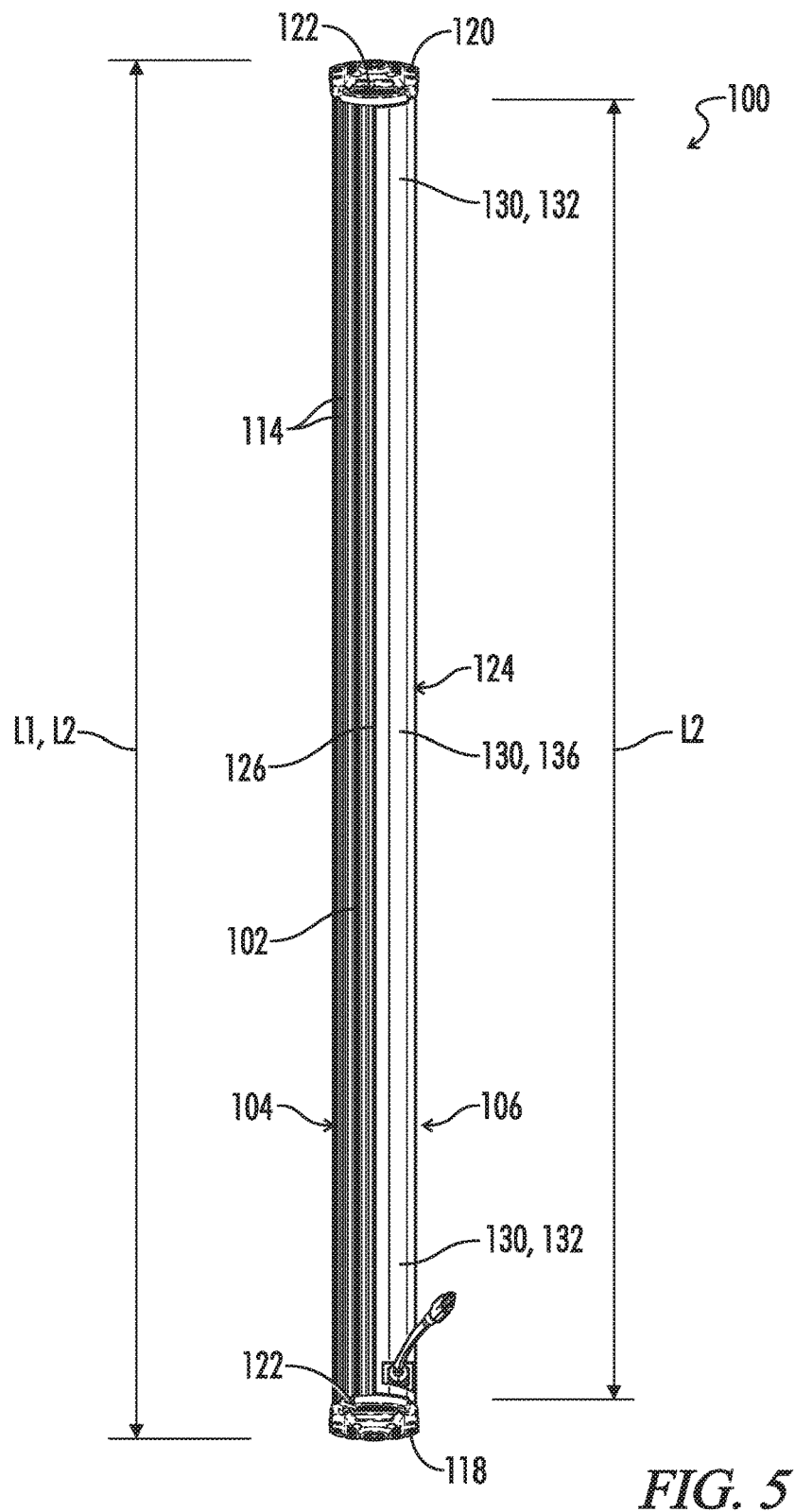
FIG. 5 is a rear elevation view of the light bar assembly of FIG. 1.
Figure 6:
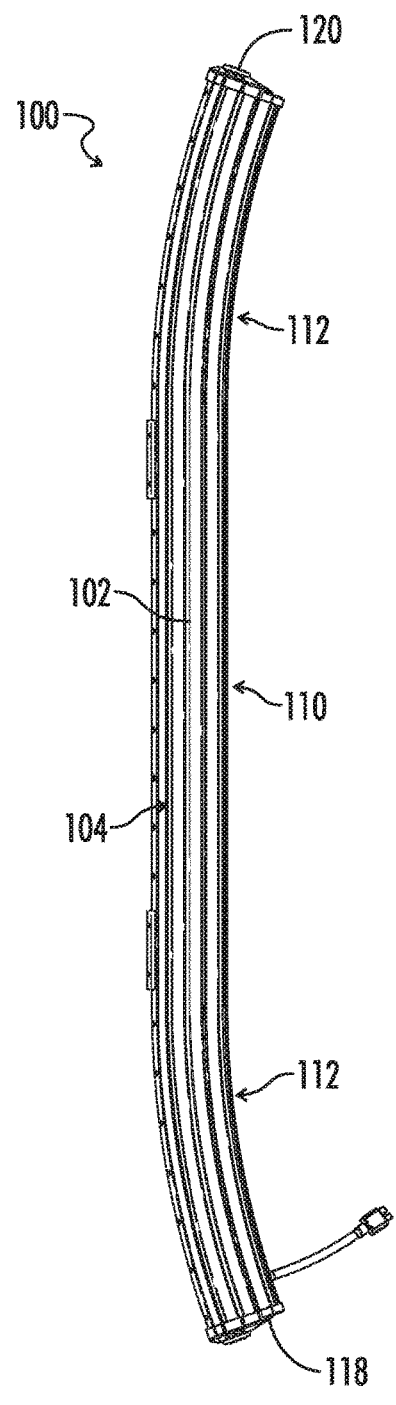
FIG. 6 is a top plan view of the light bar assembly of FIG. 1.
Figure 7:
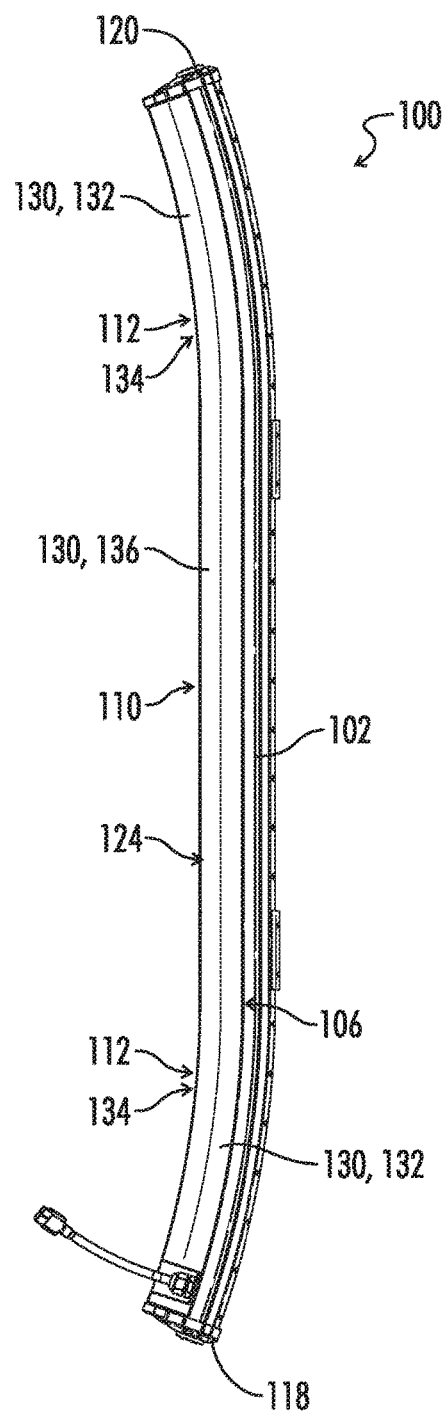
FIG. 7 is a bottom plan view of the light bar assembly of FIG. 1.
Figure 8:
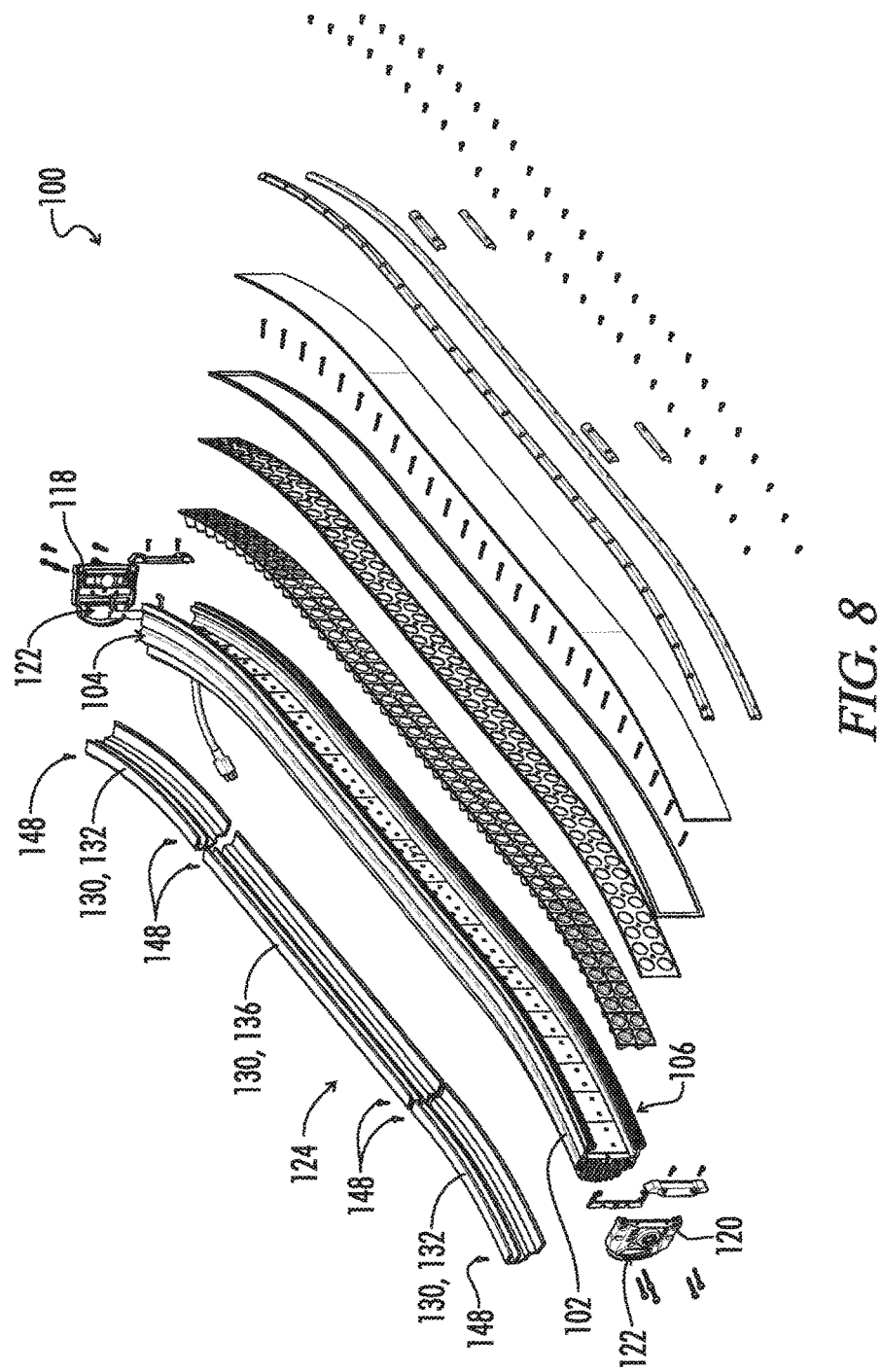
FIG. 8 is an exploded front upper perspective view of the light bar assembly of FIG. 1.
Figure 9:
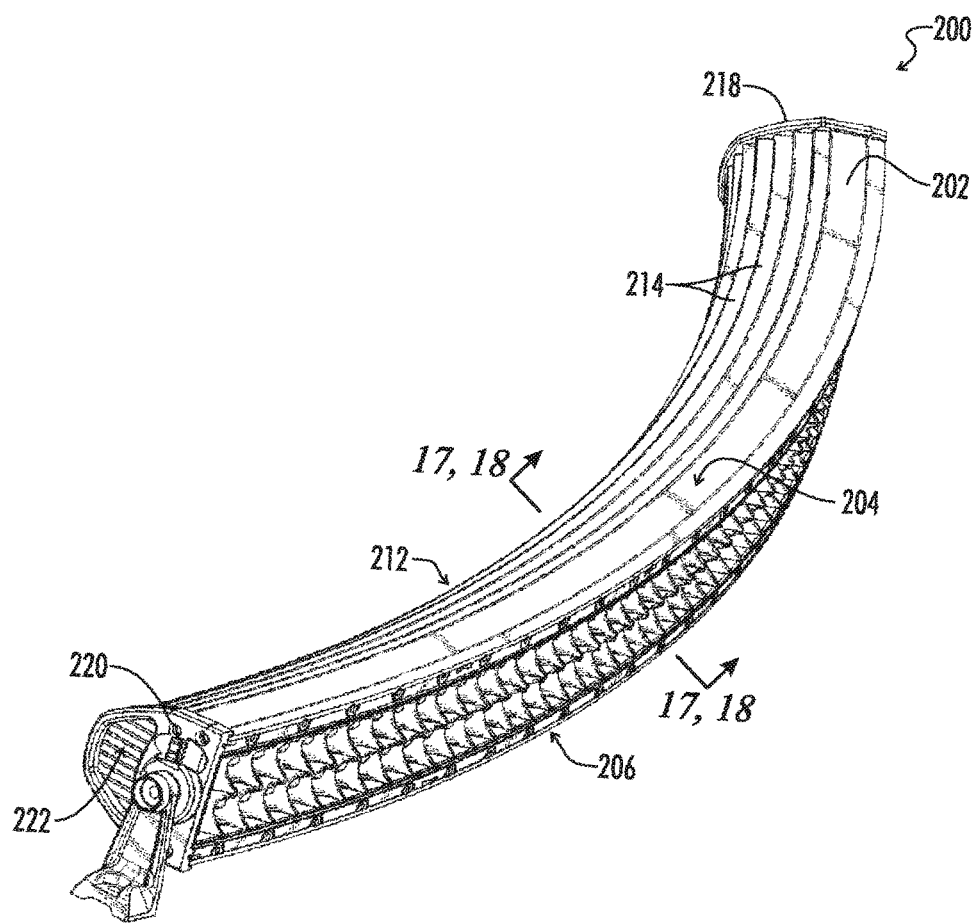
FIG. 9 is a front upper perspective view of another embodiment of a light bar assembly.
Figure 10:
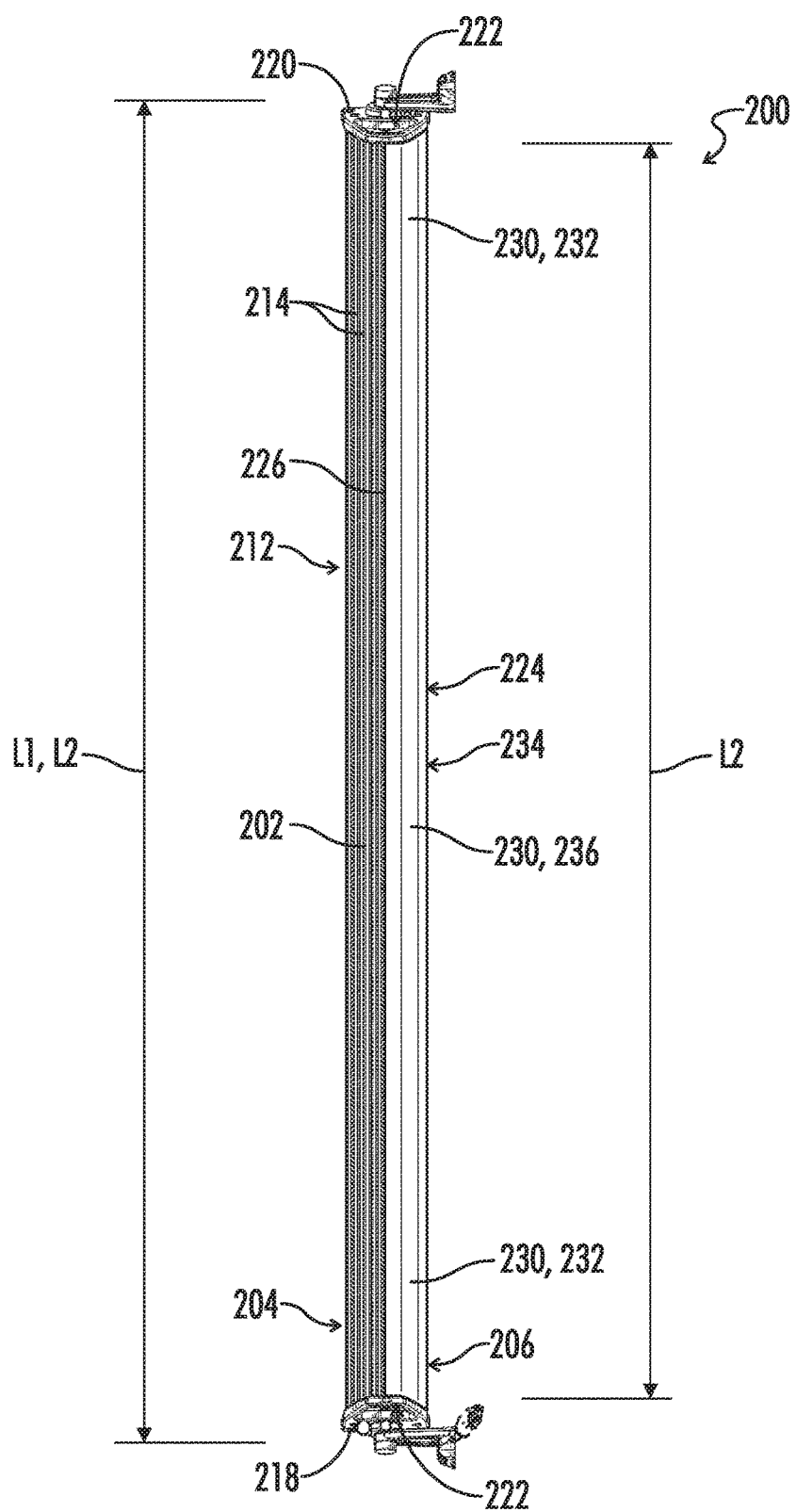
FIG. 10 is a rear elevation view of the light bar assembly of FIG. 9.
Figure 11:
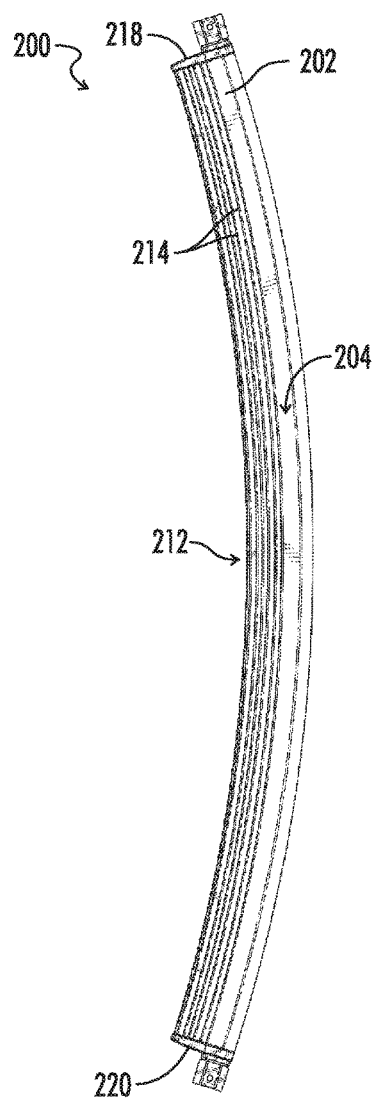
FIG. 11 is a top plan view of the light bar assembly of FIG. 9.
Figure 12:
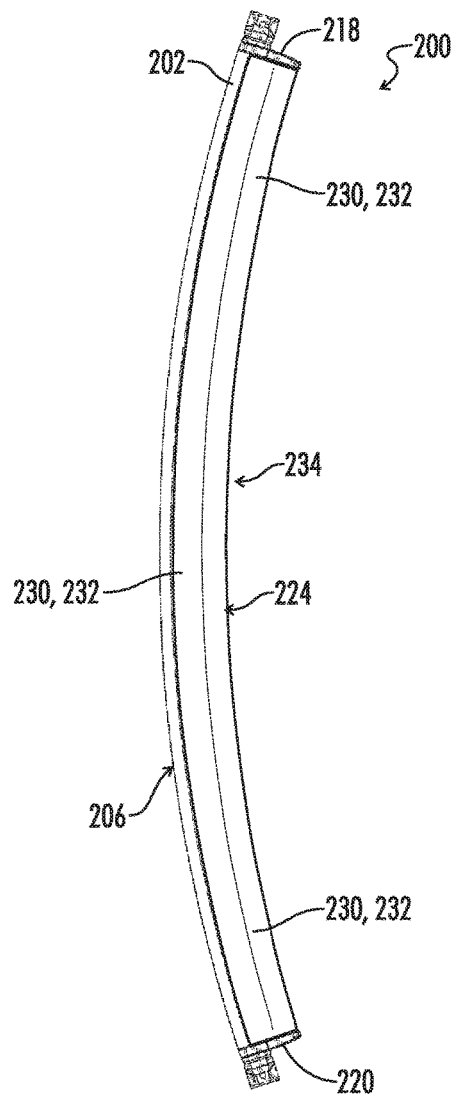
FIG. 12 is a bottom plan view of the light bar assembly of FIG. 9.
Figures 13, 14:
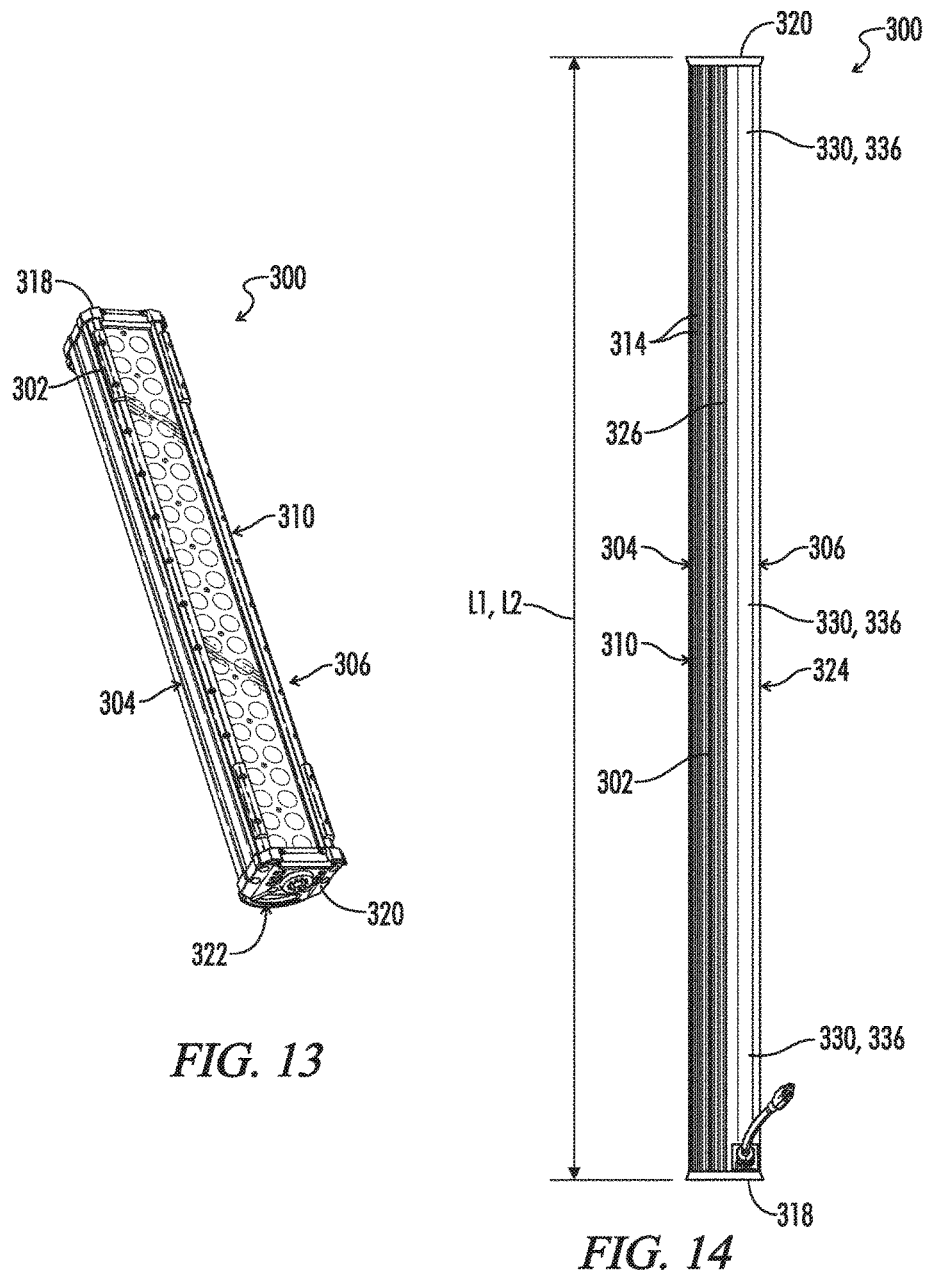
FIG. 13 is a front upper perspective view of yet another embodiment of a light bar assembly.
FIG. 14 is a rear elevation view of the light bar assembly of FIG. 13.
Figure 15:
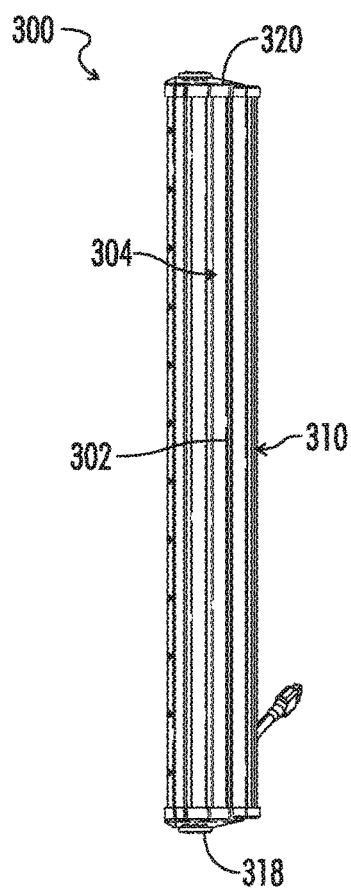
FIG. 15 is a top plan view of the light bar assembly of FIG. 13.
Figure 16:
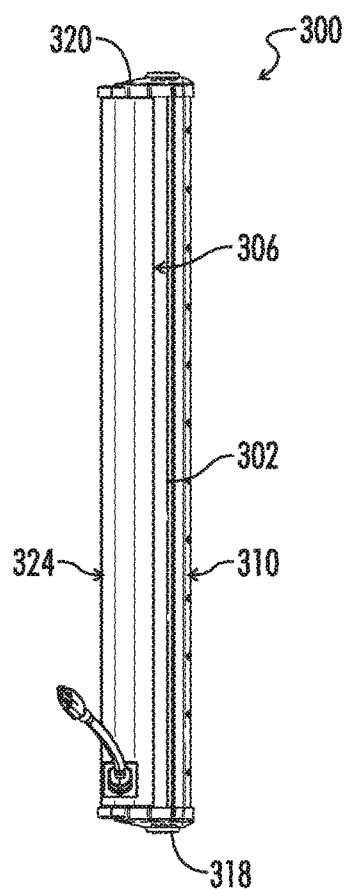
FIG. 16 is a bottom plan view of the light bar assembly of FIG. 13.

Referring to FIGS. 1 and 2, a vehicle 11, illustrated as a pickup truck, includes a light bar assembly 100 mounted thereon.

Turning now to FIGS. 3-8, the light bar assembly 100 may include a light bar housing 102. The light bar housing may have a bar length L1. The light bar housing 102 may be a continuous extrusion of metal such as aluminum or aluminum alloy. The light bar housing 102 may also have a top side 104 and a bottom side 106 opposite the top side. When the light bar assembly 100 is mounted to a vehicle 11, the bottom side 106 is closer to the vehicle than the top side 104. At least one ridge 108 may also be provided on the bottom side 106 of the light bar housing 102. The light bar housing may include a straight portion 110 along the bar length. Some embodiments may include the light bar housing 102 having at least one bar curve 112 along the bar length L1 of the light bar housing.

Figure 17:
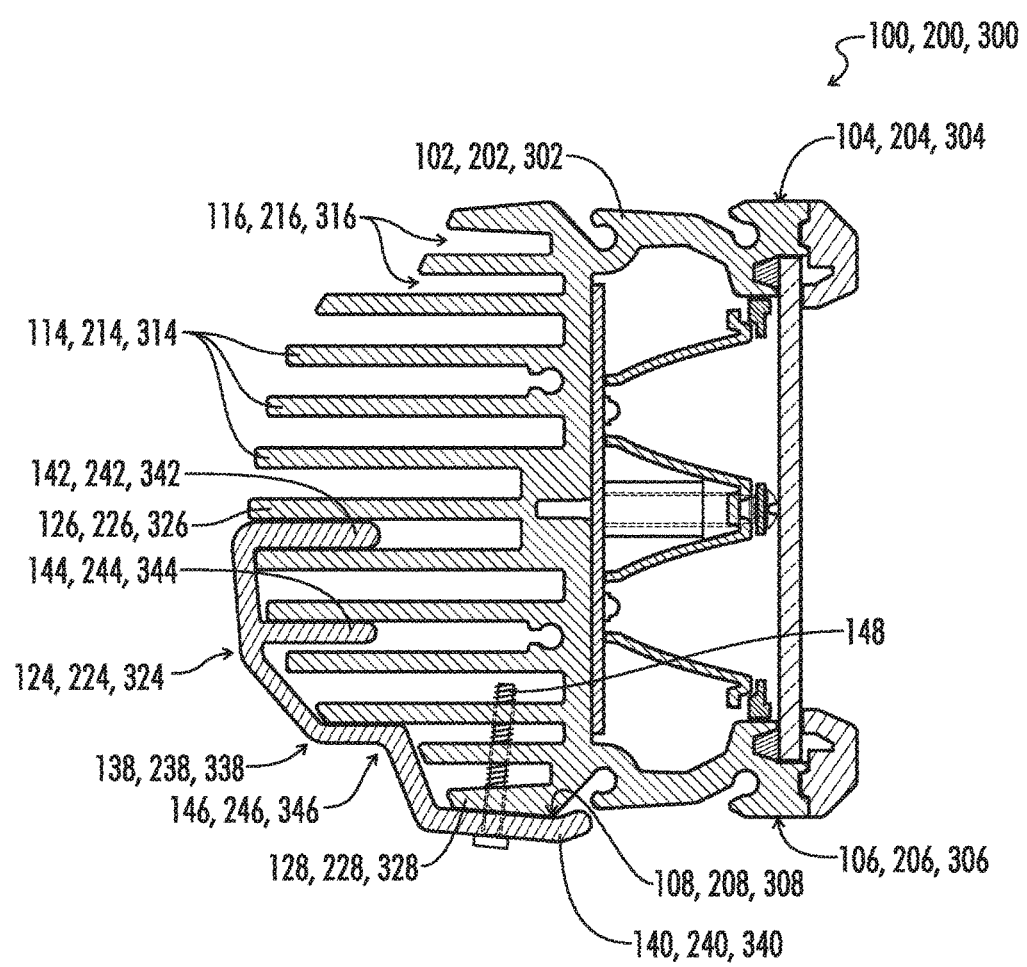
FIG. 17 is a cross-sectional view of the light bar assembly of either FIG. 1, FIG. 9, or FIG. 13 including a first embodiment of a wind shield.
Figure 18:
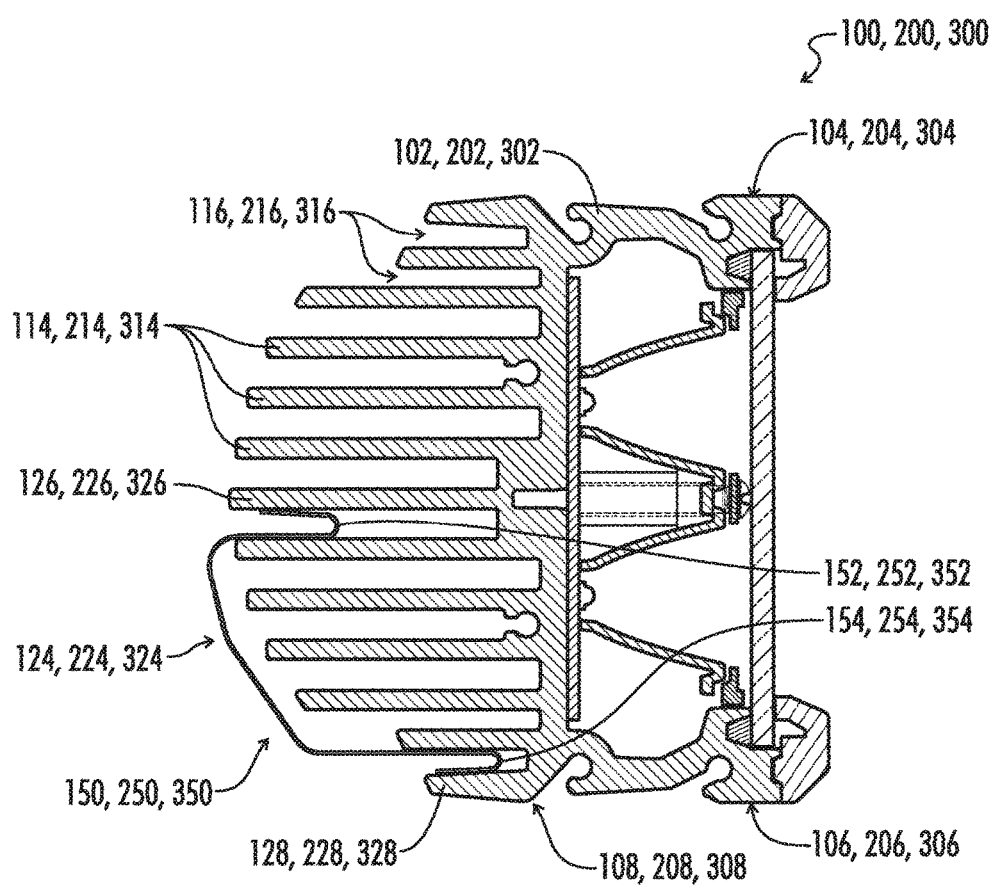
FIG. 18 is a cross-sectional view of the light bar assembly of either FIG. 1, FIG. 9, or FIG. 13 including a second embodiment of a wind shield.

As can best be seen in FIGS. 17 and 18, the light bar housing 102 may further include a plurality of fins 114 projecting from the light bar housing. These fins 114 may project from the light bar housing 102 any appropriate width, and the fins may have any appropriate thickness. Further, the fins may all be of the same or differing widths and thicknesses. The fins 114 may be decorative and may additionally, or alternatively, provide a heat sink functionality for any heat produced within the light bar housing 102. Further still, the ridge 108 may, in some embodiments, be formed by the connection point of one of the fins 114 to the rest of the light bar housing 102.

The light bar housing 102 may further include a plurality of fin gaps 116. Each fin gap 116 may be disposed between adjacent respective fins 114. Each fin gap 116 may also have a gap length L2 (shown in FIG. 5) running longitudinally along a majority of the bar length L1 of the light bar housing 102. In some embodiments, the fin gaps 116 all include a gap length L2 running along the entirety of the bar length L1 of the light bar housing 102.

Returning to FIGS. 3-8, the light bar assembly 100 may further include the light bar housing 102 having a first end cap 118 and a second end cap 120 opposite the first end cap. The end caps 118, 120 may be configured to allow air to pass axially along the bar length L1 between adjacent fins 114. In some embodiments, the end caps 118, 120 each include an end cap opening 122 defined therein to allow the air to pass through the end cap openings.

Turning particularly to FIGS. 4, 5, 7, and 8, the light bar assembly 100 may also include a wind shield 124. The wind shield 124 may be disposed on the light bar housing 102 such that the wind shield covers some, but not all, of the fin gaps 116 along a majority of each respective gap length L2. In some embodiments, the wind shield 124 covers fin gaps 116 that are closer to the bottom side 106 than the top side 104 of the light bar housing 102. In further embodiments, the wind shield 124 may cover all the fin gaps 116 that are closer to the bottom side 106 than the top side 104 of the light bar housing 102. Stated another way, the wind shield 124 may cover all the fin gaps 116 between a middle fin 126 and a bottom fin 128 of the light bar housing 102.

The wind shield 124 may include a plurality of wind shield sections 130. For embodiments of the light bar assembly 100 including the light bar housing 102 having at least one bar curve 112 along the bar length L1 of the light bar housing, the wind shield sections 130 may include at least one curved wind shield section 132. Whether the wind shield 124 has wind shield sections 130 or not, the wind shield may include at least one wind shield curve 134 that is concentric with the at least one bar curve 112 of the light bar housing 102. Stated another way, for each bar curve 112 of the light bar housing 102, the wind shield 124 may have a corresponding wind shield curve 134. The wind shield curves 134 may be part of a single, unitary wind shield or of a wind shield 124 including the wind shield sections 130. The wind shield sections 130 may additionally include at least one straight wind shield section 136 in some embodiments.

With reference particularly to FIG. 17, a first embodiment of a wind shield 138 may be configured such that the wind shield is clampingly disposed on the light bar housing 102. The wind shield 138 may be made of any appropriate materials, such as plastic, metals, metal alloys, composites, and the like. The wind shield 138 may also be manufactured in any appropriate manner including, but not limited to, extrusion, casting, molding, 3D printing, CNC production, and the like. In some embodiments of the wind shield 138, a ridge catch 140 may be configured to extend over the ridge 108 of the light bar housing 102 when the wind shield is installed on the light bar housing. Further embodiments may also include the wind shield 138 further including a first fin catch 142 opposite the ridge catch 140. The first fin catch 142 may be configured to extend over a respective fin 114, such as the fin directly below the middle fin 126, when the wind shield 138 is installed on the light bar housing 102. It should be understood that occupying at least a portion of the fin gap 116 between the middle fin 126 and the fin directly below the middle fin with the first fin catch 142, for instance, may be considered covering the fin gap 116 between the middle fin and the fin directly below the middle fin in some embodiments. In many embodiments, the first fin catch 142 may be sized to be substantially the same thickness as the corresponding fin gap 116 such that the first fin catch occupies the entire distance between the middle fin 126 and the fin directly below the middle fin. In embodiments of the wind shield 138 having both the ridge catch 140 and the first fin catch 142, the ridge catch and the first fin catch may be biased toward one another such that the wind shield may clamp onto the light bar housing 102.

The wind shield 138 may further include at least one additional fin catch, or second fin catch 144, configured to occupy a fin gap 116 other than the fin gap occupied by the first fin catch 142. The second fin catch 144 may be biased toward the ridge catch 140, like the first fin catch 142, to provide additional clamping force on the light bar housing 102. The second fin catch 144 may alternatively be biased toward the first fin catch 142 to provide a clamping force between the second fin catch and the first fin catch. In such embodiments, the ridge catch 140 may be omitted or may not be biased to cause a clamping force on the light bar housing 102.

The wind shield 138 may also include a notch 146 such that the wind shield may closely follow the contour of the light bar housing 102 when viewed in cross-section (such as FIG. 17). The wind shield 138 may have substantially the same profile as the edges of the fins 114 such that the wind shield conforms to the light bar housing 102.

In some embodiments, the wind shield 138 may be configured to overlap at least a portion of the bottom side 106 of the light bar housing 102. In such embodiments, a fastener 148 may extend through the wind shield 138 and into the bottom side 106 of the light bar housing 102 to connect the wind shield to the light bar housing. Many embodiments may include the ridge catch 140 extending over the bottom fin 128 to engage the ridge 108 on the bottom side 106 of the light bar housing 102. In such embodiments, the fastener 148 may pass through the ridge catch 140 and into the bottom fin 128. In some embodiments, the fastener 148 may additionally pass through the bottom fin 128 and through one or more successive fins 114 toward the top side 104 of the light bar housing 102. The fastener 148 may hold the wind shield 138 on the light bar housing 102 by itself or with the help of one or more of the first fin catch 142, the second fin catch 144, and the ridge catch 140.

In some embodiments of the light bar assembly 100 including a wind shield 124 with multiple wind shield sections 130, each wind shield section may be connected to the light bar housing 102 with at least two fasteners 148. More or fewer fasteners 148 may be utilized in alternative embodiments, however.

Referring now particularly to FIG. 18, a second embodiment of a wind shield 150 is shown. The wind shield 150 may include a first resilient insert 152 and a second resilient insert 154 opposite the first resilient insert. The first resilient insert 152 may be inserted in the fin gap 116 between the middle fin 126 and the fin 114 directly below the middle fin in some embodiments. In many embodiments, the second resilient insert 154 may be inserted in the fin gap 116 between the bottom fin 128 and the fin 114 directly above the bottom fin. Each resilient insert 152, 154 may be biased in a spread apart fashion against adjacent respective fins 114 when the wind shield 150 is mounted to the light bar housing 102. A fastener 148 may also additionally be used at any point on the light bar assembly 100 to help secure the wind shield 150 to the light bar housing 102.

In some embodiments of the wind shield 150, the wind shield may be made substantially of a metal or metal alloy such that repeated use may be facilitated by the increased durability offered by metals. This feature is not required, however, and the wind shield 150 could additionally or alternatively include any other materials, such as extruded plastic. It should be understood that occupying at least a portion of the fin gap 116 between the middle fin 126 and the fin directly below the middle fin with the first resilient insert 152, for instance, may be considered covering the fin gap 116 between the middle fin and the fin directly below the middle fin in some embodiments. Similarly, occupying at least a portion of the fin gap 116 between the bottom fin 128 and the fin directly above the bottom fin with the second resilient insert 154, for instance, may be considered covering the respective fin gap.

The wind shield 150 may closely follow the contour of the light bar housing 102 when viewed in cross-section (such as FIG. 18). The wind shield 150 may have substantially the same profile as the edges of the fins 114 such that the wind shield conforms to the light bar housing 102.

Referring now to FIGS. 9-12, a second embodiment of a light bar assembly 200 is shown. The light bar assembly 200 may have many components, elements, and features that are similar to those of the first embodiment of the light bar assembly 100 discussed above. Any substantially similar component, element, or feature with regard to the second embodiment of the light bar assembly 200 will have a number that is a value of one hundred higher than the corresponding component, element, or feature with regard to the first embodiment of the light bar assembly 100. As such, not all of the reference characters shown in the drawings may be explicitly mentioned in the specification with regard to the second embodiment of the light bar assembly 200. Likewise, the description of the second embodiment of the light bar assembly 200 will be limited to differences from the first embodiment of the light bar assembly 100.

The light bar housing 202 of the light bar assembly 200 may be curved along the entire bar length L1 of the light bar housing. As such, the light bar assembly 200 may be considered to be a curved light bar assembly. In such embodiments, the wind shield 224 may include at least one wind shield curve 234 that is concentric with the at least one bar curve 212 of the light bar housing 202. In embodiments of the wind shield 224 having multiple wind shield sections 230, all of the wind shield sections may be curved wind shield sections 232.

Turning now to FIGS. 13-16, a third embodiment of a light bar assembly 300 is shown. The light bar assembly 300 may have many components, elements, and features that are similar to those of the first embodiment of the light bar assembly 100 discussed above. Any substantially similar component, element, or feature with regard to the third embodiment of the light bar assembly 300 will have a number that is a value of two hundred higher than the corresponding component, element, or feature with regard to the first embodiment of the light bar assembly 100. As such, not all of the reference characters shown in the drawings may be explicitly mentioned in the specification with regard to the third embodiment of the light bar assembly 300. Likewise, the description of the third embodiment of the light bar assembly 300 will be limited to differences from the first embodiment of the light bar assembly 100.

The light bar housing 302 may be straight along the entire bar length L1 of the light bar housing. As such, the light bar assembly 300 may be considered to be a straight light bar assembly. The wind shield 324 may include multiple straight wind shield sections 336 in some embodiments, but the wind shield may also be formed of a single, unitary piece.

The present disclosure also relates, in part, to a method of manufacturing a light bar assembly 100, 200, 300. The method may include: providing a light bar housing 102, 202, 302 including a plurality of fins 114, 214, 314 and a plurality of fin gaps 116, 216, 316. Each fin gap 116, 216, 316 may be disposed between adjacent fins 114, 214, 314. The method may further include covering some, but not all, of the fin gaps 116, 216, 316. Thereby, air is prevented from passing over each fin gap 116, 216, 316 that is covered. Air may still flow axially along the bar length L1 of the light bar housing 102, 202, 302 between fins 114, 214, 314 in some embodiments, but air may not pass over fin gaps 116, 216, 316 in a direction perpendicular to the adjacent respective fins of the covered fin gaps.

In embodiments allowing axial air flow along the bar length L1 of the light bar housing 102, 202, 302 between fins 114, 214, 314, the first end cap 116, 216, 316 and second end cap 118, 218, 318 may include end cap openings 122, 222, 322 such that the ends of the light bar housing 102, 202, 302 are at least partially unobstructed.

Some embodiments of the method may include covering at least two fin gaps 116, 216, 316 that are closer to a bottom side 106, 206, 306 of the light bar housing 102, 202, 302 than a top side 108, 208, 308 of the light bar housing. Further still embodiments include covering all of the fin gaps 116, 216, 316 that are closer to the bottom side 106, 206, 306 of the light bar housing 102, 202, 302 than the top side 108, 208, 308 of the light bar housing.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A light bar assembly comprising:
a light bar housing having a bar length and including:
a plurality of fins projecting from the light bar housing; and
a plurality of fin gaps, each fin gap disposed between adjacent respective fins, each fin gap having a gap length running longitudinally along a majority of the bar length of the light bar housing; and
a wind shield disposed on the light bar housing such that the wind shield covers some, but not all, of the fin gaps along a majority of each respective gap length.

2. The light bar assembly of claim 1, wherein:
the light bar housing includes a top side and a bottom side opposite the top side; and
the wind shield covers fin gaps that are closer to the bottom side than the top side.

3. The light bar assembly of claim 2, wherein:
the wind shield covers all the fin gaps that are closer to the bottom side than the top side.

4. The light bar assembly of claim 2, wherein:
the light bar housing is configured such that, when the light bar assembly is mounted to a vehicle, the bottom side is closer to the vehicle than the top side.

5. The light bar assembly of claim 2, further comprising:
the light bar housing further including a ridge disposed on the bottom side of the light bar housing; and
wherein the wind shield includes a ridge catch configured to extend over the ridge.

6. The light bar assembly of claim 5, further comprising:
the wind shield further including a fin catch opposite the ridge catch, the fin catch configured to extend over a respective fin.

7. The light bar assembly of claim 6, wherein:
the ridge catch and the fin catch of the wind shield are biased toward one another such that the wind shield is clampingly disposed on the light bar housing.

8. The light bar assembly of claim 2, further comprising:
the wind shield configured to overlap at least a portion of the bottom side of the light bar housing; and
a fastener extending through the wind shield and into the bottom side of the light bar housing to connect the wind shield to the light bar housing.

9. The light bar assembly of claim 1, wherein:
the light bar housing is straight along the entire bar length of the light bar housing.

10. The light bar assembly of claim 1, wherein:
the light bar housing includes at least one bar curve along the bar length of the light bar housing.

11. The light bar assembly of claim 10, wherein:
the light bar housing is curved along the entire bar length of the light bar housing.

12. The light bar assembly of claim 10, further comprising:
the wind shield including a plurality of wind shield sections.

13. The light bar assembly of claim 12, wherein:
at least one wind shield section includes a curved wind shield section.

14. The light bar assembly of claim 12, wherein:
each wind shield section is connected to the light bar housing with at least two fasteners.

15. The light bar assembly of claim 10, further comprising:
the wind shield including at least one wind shield curve that is concentric with the at least one bar curve of the light bar housing.

16. The light bar assembly of claim 1, further comprising:
the light bar housing further including a first end cap and a second end cap opposite the first end cap; and
wherein both the first end cap and the second end cap are configured to allow air to pass axially along the bar length between adjacent fins.

17. A method of manufacturing a light bar assembly, the method comprising:
(a) providing a light bar housing having a bar length and including a plurality of fins and a plurality of fin gaps, each fin gap disposed between adjacent respective fins and having a gap length running longitudinally along a majority of the bar length; and
(b) covering a majority of the gap length of some, but not all, of the fin gaps, thereby preventing air from passing over each covered fin gap in a direction perpendicular to the adjacent respective fins of the covered fin gap.

18. The method of claim 17, further comprising:
maintaining first and second ends of the light bar housing at least partially unobstructed such that air may flow axially along the bar length of the light bar housing between the plurality of fins.

19. The method of claim 17, wherein:
step (b) includes covering at least two fin gaps that are closer to a bottom side of the light bar housing than a top side of the light bar housing, the bottom side being opposite the top side.

20. The method of claim 19, wherein:
step (b) further includes covering all of the fin gaps that are closer to the bottom side of the light bar housing than the top side of the light bar housing.

* * * * *